(12) United States Patent
An et al.

(10) Patent No.: US 6,463,357 B1
(45) Date of Patent: Oct. 8, 2002

(54) METHOD AND SYSTEM FOR PRECISION OPERATIONAL CONTROL OF AUTOMATED MACHINES

(75) Inventors: Dong An; ZongKe Li; Hiram McCall; Ching-Fang Lin, all of Simi Valley, CA (US)

(73) Assignee: American GNC Corporation, Simi Valley, CA (US)

( * ) Notice: Subject to any disclaimer, the term of this patent is extended or adjusted under 35 U.S.C. 154(b) by 0 days.

(21) Appl. No.: 10/072,835

(22) Filed: Feb. 6, 2002

Related U.S. Application Data
(60) Provisional application No. 60/266,972, filed on Feb. 6, 2001.

(51) Int. Cl.$^7$ .............................................. G06F 19/00
(52) U.S. Cl. .................... 700/245; 700/187; 700/255; 700/172; 700/176; 700/180; 700/189; 700/190; 318/567; 714/11; 714/819; 111/177
(58) Field of Search ................... 700/187, 245, 700/255, 172, 176, 180, 189, 190, 7, 76, 23, 50, 48, 33, 36, 29, 35; 318/567; 714/11, 819; 111/177

(56) References Cited

U.S. PATENT DOCUMENTS

| | | | |
|---|---|---|---|
| 3,970,830 A | * | 7/1976 | White et al. ............... 700/187 |
| 5,394,678 A | * | 3/1995 | Lonn et al. ............. 56/10.2 H |
| 5,657,224 A | * | 8/1997 | Lonn et al. ................... 701/50 |
| 5,802,226 A | * | 9/1998 | Dischert et al. ............ 700/255 |
| 6,092,217 A | * | 7/2000 | Kanekawa et al. ........... 714/11 |
| 6,223,110 B1 | * | 4/2001 | Rowe et al. ................... 701/50 |
| 6,230,089 B1 | * | 5/2001 | Lonn et al. ................... 701/48 |

OTHER PUBLICATIONS

Favre–Bulle, An inertial navigation system for robot measurement and control, 1993, IEEE, pp.383–389.*
Bhanu et al., Inertial navigation sensor integrated motion analysis for obstacle detection, 1990, IEEE, pp. 954–959.*

* cited by examiner

Primary Examiner—Jacques H. Louis-Jacques
Assistant Examiner—McDieunel Marc
(74) Attorney, Agent, or Firm—Raymond Y. Chan; David and Raymond Patent Group (57) ABSTRACT

A system and method for precision operational control of automated machines includes a motion element, an IMU (Inital Measuring Unit) installed at an end effector of the motion element for sensing and providing a motion measurement of the motion element, a central control processor receiving output of the IMU and producing commands, and a motion actuator receiving the commands from the central control processor to control the movement of the end effector of the motion element, so as to enable autonomous/ intelligent control of the automated machine's end effector by incorporating the IMU to permit direct servo-control of the end effector's acceleration, velocity, angular rate. and angle—this closed-loop system minimizes effects of such disturbances like mechanical flexing and bending due to loading and nonlinear torques due to hydraulic components.

27 Claims, 8 Drawing Sheets

METHOD AND SYSTEM FOR PRECISION OPERATIONAL CONTROL OF AUTOMATED MACHINES

Cross Reference of Related Application

This is a regular application of a provisional application having an application Ser. No. of 60/266,972 and a filing date of Feb. 6, 2001.

BACKGROUND OF THE INVENTION

1. Field of the Invention

The present invention relates to a control method and system for automated machines, and more particularly to a precision operational control method and system for an automated machine, wherein output data of an inertial sensor package installed in the grip or claw of the automated machine are received and processed in a central control processor for the automated machine, with electromechanical servo actuator valves and the surrounding loop controls to precisely control the movement of a motion element such as a grip or claw of the automated machine.

2. Description of Related Arts

Various automated machines, such as robots, smart cranes, etc., are being developed to facilitate automated operations, production, and processes. However, it's still a challenge to design highly accurate operational controls for an automated machine.

The automated machine is configured with several major linkages, which produce the gross motion of the end effector. Without feeding back the motion sensed at the end effector, manipulation of its position and orientation has to be done at a slow speed and requires extensive operators'assistance.

SUMMARY OF THE INVENTION

It is a main objective of the present invention to provide a method and system for precision operational control of an automated machine, wherein a micro IMU(Inital Measuring Unit)(such as the U.S. patent application Ser. No. 09/477, 151, filed Jan. 4, 2000, entitled "micro IMU", now allowed, and the U.S. Patent pending application Ser. No. 09/624,366, filed Jul. 25, 2000, entitled "coremicro® IMU") is incorporated, so that the acceleration, velocity, angle rate, and angle of the grip or claw of the automated machine are all commanded with high accuracy, and effects from the mechanical portions of the loop, such as the mechanical flexing and bending due to loading, and nonlinear torques due to hydraulic components are minimized.

Another objective of the present invention is to provide a method and system for precision operational control of an automated machine that enables autonomous/intelligent control of the automated machine's end effector by incorporating an IMU to permit direct servo-control of the end effector's acceleration, velocity, angular rate, and angle— this closed-loop system minimizes effects of such disturbances as mechanical flexing and bending due to loading and nonlinear torques due to hydraulic components.

Another objective of the present invention is to provide a method and system for precision operational control of an automated machine, wherein control loops are formed through the use of actuators and outputs of the IMU linked with software for enhanced performance and agile operation of the automated machine.

Another objective of the present invention is to provide a method and system for precision operational control of an automated machine, wherein the application aspects of the IMU is designed to enhance manual and automatic control of the machine. The use of the IMU was applied within the context of control loops that can enhance the machine's motion profiles.

Another objective of the present invention is to provide a method and system for precision operational control of an automated machine, wherein the IMU is totally self sufficient to provide all data necessary for motion measurement of the machine.

Another objective of the present invent is to provide a method and system for precision operational control of an automated machine, wherein the control loops are configured starting with an inner loop and expanding the functionality With successive layers of outer loops.

In order to accomplish the above objectives, an IMU is installed at an end effector of a motion element of an automated machine, fast-response feedback control for both position and angle servo-loops (for the end effector) greatly decreases the operational time needed to complete a preplanned trajectory. In addition, the closed-loop control design provides stabilization and isolation of the end effector from external disturbances The application of the IMU as a sensor for providing velocity and position of the tool with respect to the base of the automated machine expressed in the navigation (earth fixed) frame requires the use of specific processing methods and software in order to form the navigation solution.

This unique navigation solution is based upon the use of a set of equations performing an open loop computation with the inertial data as its input. This formulation of equations requires a periodic update of the open loop solution in order to bound the growth of system errors. The source of this update is the automated machine position measurement derived from the mechanical sensors in the system.

The performance enhancements gained by obtaining an inertially referenced solution to the position data is to increase the devices bandwidth, remove the effects of mechanical compliance and resonance, and to provide an earth fixed reference for the sensed motion of the automated machine.

DETAILED DESCRIPTION OF THE PREFERRED EMBODIMENT

Referring to FIGS. 1 to 8, a system for precision operational control of automated machines according to a preferred embodiment of the present invention is illustrated, which comprises a motion element 5 such as a holding element like a grip or claw, an inertial sensor package 1 installed at an end effector of the motion element 5 for sensing and providing a motion measurement of the motion element 5, a central control processor 2 receiving output of the inertial sensor package and producing commands. and a motion actuator 34 receiving the commands from the central control processor 2 to control the movement of the end effector of the motion element 5.

Figure 1:
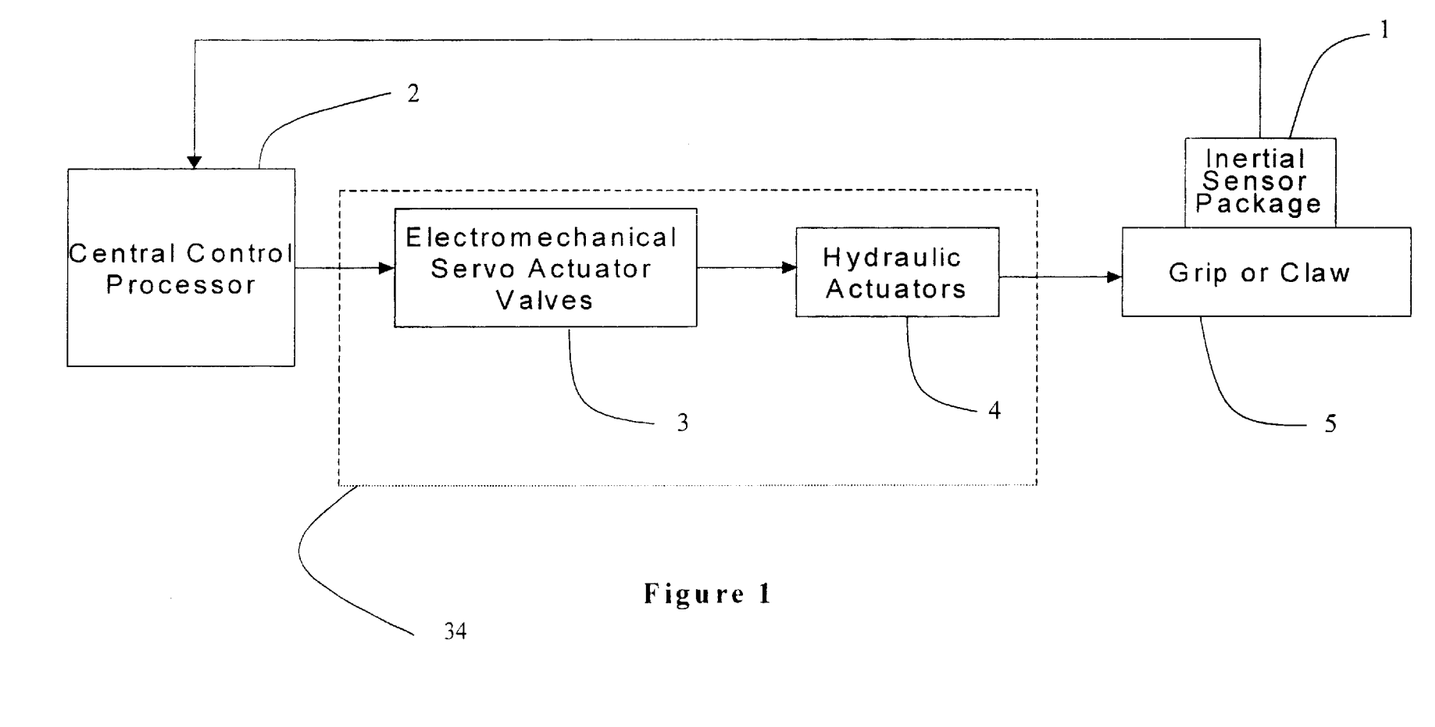
FIG. 1 is a block diagram illustrating a generic system configuration according to a preferred embodiment of the present invention.

According to the preferred embodiment as shown in FIG. 1, the motion actuator 34 is embodied to include one or more electromechanical servo actuator valves 3 and one or more hydraulic actuators 4 which is controlled by the electromechanical servo actuator valves 3, wherein the central control processor 2 receives output of the inertial sensor package 1 and produces commands to the electromechanical servo actuator valves 3 to control the hydraulic actuators 4 for making the motion element 5 move.

Referring to FIG. 1, the operational process of the system comprises the steps of:

(1) sensing a motion and motion changes of the end effector 51 of the motion element 5, i.e. the grip or claw, by the inertial sensor package 1;

(2) providing an accurate motion measurement of the end effector 51 of the motion element 5 through a navigation processing by the inertial sensor package to obtain measurement data;

(3) sending the measurement data from the inertial sensor package 1 to the central control processor 2;

(4) receiving the measurement data from the inertial sensor package 1 by the central control processor 2, (5) comparing the measurement data with a command input to form error data;

(6) receiving the error data in the central control processor:

(7) producing a control signal by using a controller algorithm in the central control processor 2;

(8) sending the control signal to the motion actuator 34 to control speed and force outputs of motion actuator 34; and (9) driving the end effector 51 of the motion element 5 (grip or claw) by the motion actuator 34 according to the control signal, wherein under the control, the error between the measured motion and the input command converges to zero. That is, the end effector of the motion element 5 moves along a trajectory as the input command requires. Because of a closed-loop control system and method are used, the interference to the end effector motion inside the loop is diminished.

According to the preferred embodiment, in the step (8), the control signal is sent to the electromechanical servo actuator valves 3 to control the hydraulic flow to the hydraulic actuators 4 (hydraulic motors) so that the speed and force outputs of the hydraulic actuators 4 are controlled.

Figure 2:
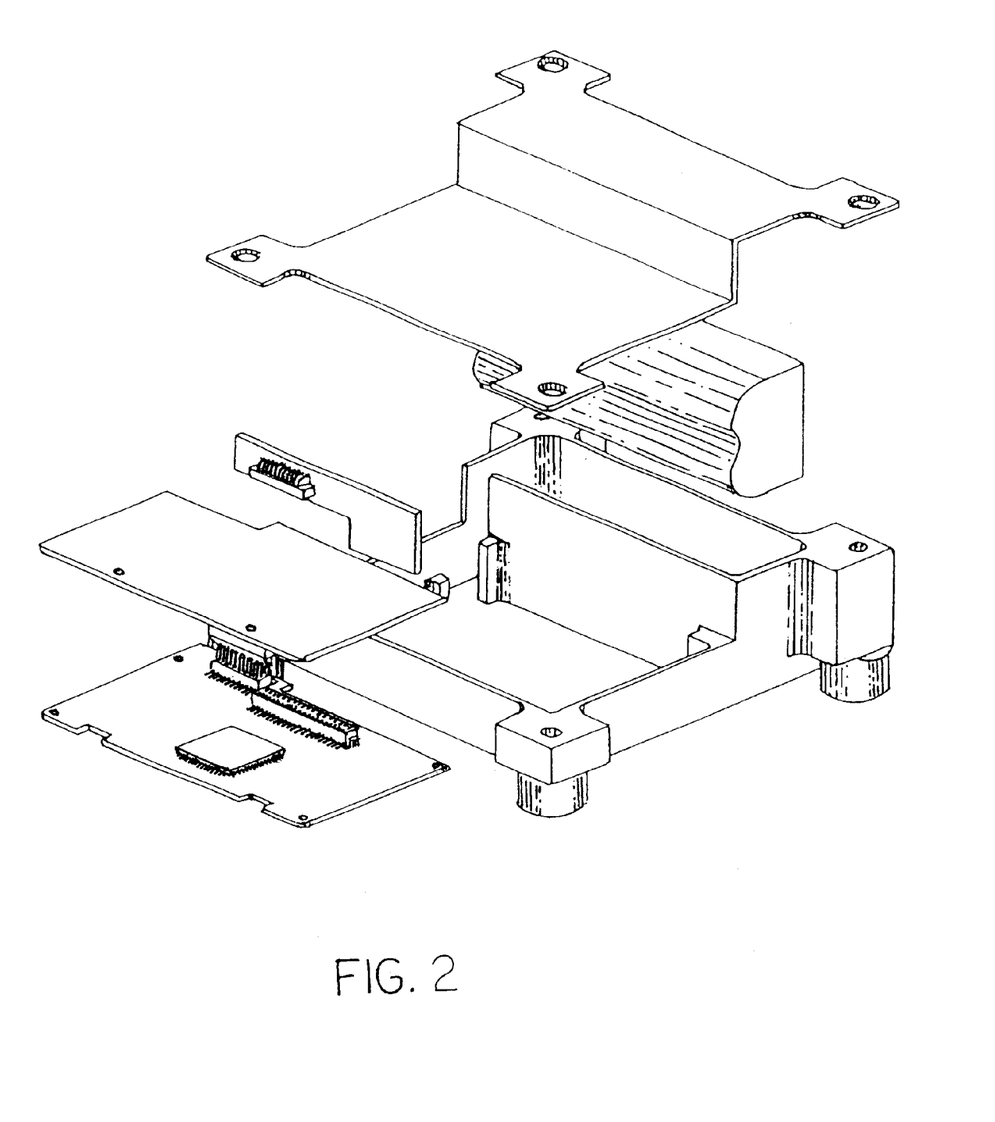
FIG. 2 is an exploded perspective view illustrating an inertial sensor package according to the above preferred embodiment of the present invention.

Moreover, in the step (9), the end effector of the motion element 5 (grip or claw) is driven by the hydraulic actuators 5 according to the control signal, wherein under the control, the error Referring to FIG. 1, with the addition of an inertial sensor package shown in FIG. 2, the electromechanical servo actuator valves A and the surrounding loop controls, the movement of the motion element 5 can be precisely controlled. Because the acceleration, velocity, angle rate, and angle are all commanded with high accuracy, effects from the mechanical portions of the loop control, such as the mechanical flexing and bending due to loading, and nonlinear torques due to hydraulic components are minimized. This enables an operator to obtain the best performance allowed by the mechanical segments of the mechanism.

Figure 3:
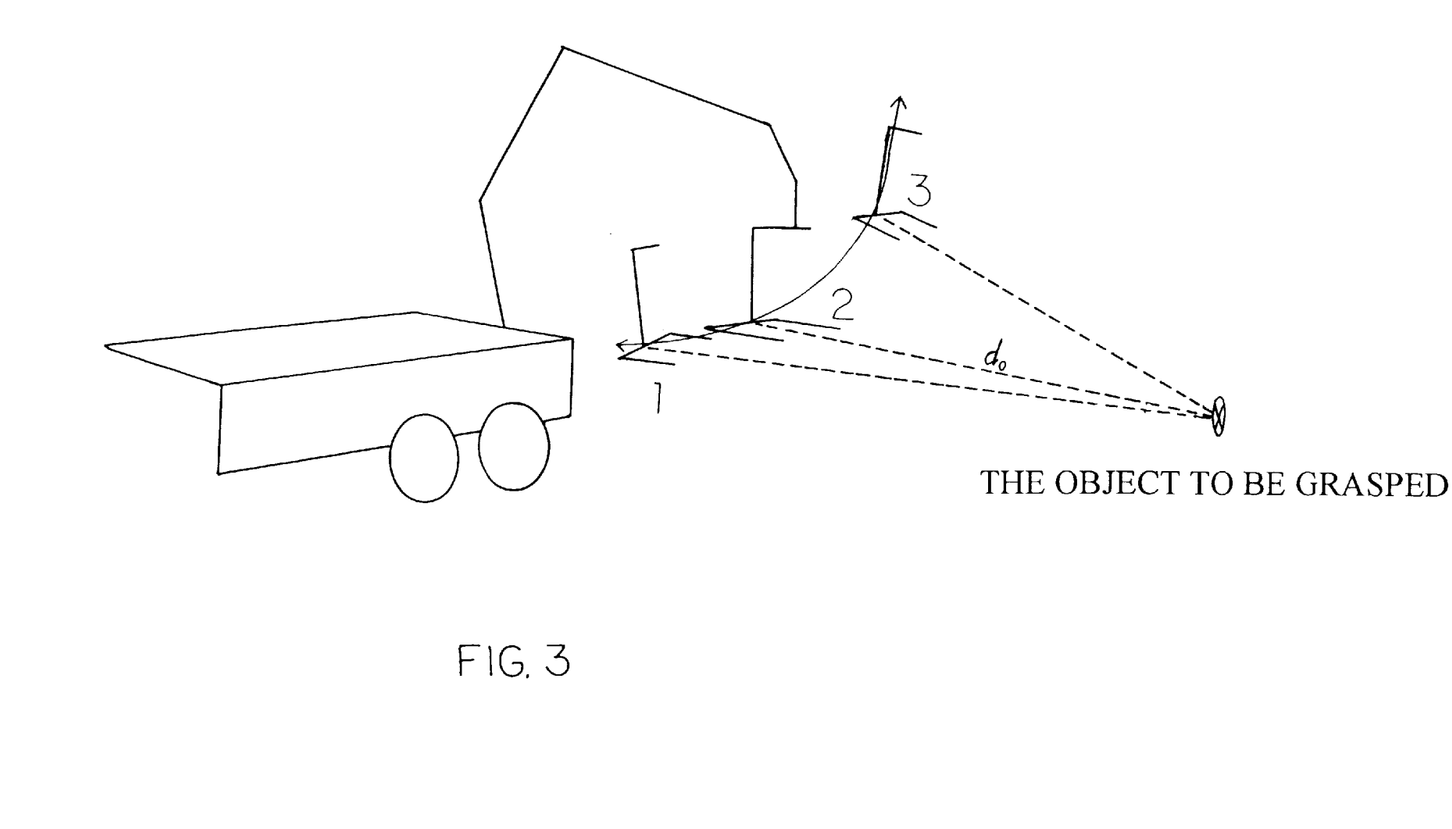
FIG. 3 is a schematic view illustrating an application of the present invention for automated machine pointing stabilization.

FIG. 3 depicts an application of the present invention for pointing stabilization. The control system automatically reorients the end effector of the motion element 5 while translating the arm. So it keeps pointing to the object to be grasped, whether it is at position 1, 2 or 3. The inertial position is updated using only IMU's gyro/accelerometer outputs for feedback. The attitude errors (from an initial reference) are computed for roll/pitch/yaw servo-control. The benefits of a closed-loop control design using the IMU include: improved pointing stabilization for a vision system and speed of operations; ability to continuously orient the end effector of the motion element 5 to a fixed reference without a vision system; availability of inertial navigation solutions for other usages (e.g., collision avoidance, cargo handling, real-time trajectory-planning, etc.)

The feedback control system relies on the control processor to produce the commands to the electromechanical servo actuator valves 3 baser on data received from the inertial sensor package 1; the electromechanical servo actuator valves 3 control the hydraulic actuators 4 that make the end effector of the motion element 5 move, and the inertial sensor package 1 installed at the end effector of the motion element 5 senses the motion.

As an application example, the effector motion is described by the following specifications of its performance when sensed by the AGNC®-2000CMIMU coremicro® IMU (U.S. patent application, application Ser. No. 09/624, 366, filed Jul. 25, 2000:

| | |
|---|---|
| Velocity accuracy | 0.08 Ft/sec |
| Angular accuracy | 0.2 deg |
| Position accuracy relative to the base | 0.75 inch |
| Bandwidth | 10 Hz |

The velocity accuracy is derived assuming a 2 sec system update rate (0.5Hz). The assumed error in acceleration is 0.00125 g or 1.25 milig. Derived from the angular tilt of the leveling loop and the other long list of lessor errors.

0.00125 G*32.141 FT/sec**2/G*2 sec=0.0803 FT/SEC

The Position accuracy relative to the base is derived from the linear acceleration error of 0.001 G.

0.5*0.001 G*32.14 ft/sec/G*(2 sec)**2*12 in/ft=0.77 inch

The angular accuracy is derived from the RSS of the Angle rate noise, the axis misalignment, and the mounting angular misalignment.

The angle derived from the angle rate noise is 0.07 deg/sec/rt-Hz*(0.5 Hz)**0.5 *2 sec=0.0989 deg, where 0.5 Hz is the correlation time of 2 seconds or 0.5 Hz. Two seconds is the update rate for the time interval of the system. The mounting accuracy is 0.15 deg. The axis misalignment is derived from the uncompensated orthogonality error of 0.005 deg and the maximum turn rate of 100 deg/sec*2 sec for the update period.

0.005 deg*100 deg/sec*2 sec*0.017 rad/deg for the misalignment=0.017 Deg

Therefore the RSS of the terms is from 0.0989 deg, 0.15 deg, and 0.017 deg $SQRT((0.09892)+(0.152)+(0.017**2))=0.18$ deg of angular accuracy The loop bandwidth is assumed to be limited by the characteristics of the electrohydraulic actuator valve in that the gyro bandwidth is about 700 Hz.

Note that performance enhancement can be realized without upgrading other costly components of the automated machine. By directly measuring the end effector motion, less costly linear and angular motion sensors for various links and joints can be utilized.

The incorporation of the IMU also engenders a variety of autonomous/intelligent operations for automated machines:

1. Optimized Trajectory Planning and Autonomous Operations—Making use of the motion state data for trajectory planning. After achieving stabilized response of the end effector of the motion element 5, the operator no longer needs to closely monitor the motions of the machine, and input commands can be structured for semiautonomous/autonomous operations.

2. Safety/Fault Monitoring—Important safety monitoring can be achieved by comparing the short-term navigation solution derived from the inertial sensors package 1 with the position and velocity estimates derived from the mechanical sensors. When the two solutions differ by more than a small amount, the system can be shut down.

3. Inertial Reference Database—Navigation solution can be stored in a database for geographic referencing of handled cargo items. Inertial orientation of cargo can be determined by resolving optical image data into an earth-fixed navigation frame of reference. The data is also available for the operator's use in commanding the machine.

4. Adaptive Gain Scheduling—Cargo mass and moment of inertia can be determined by estimating the closed loop time constants online from motion command inputs and sensed motion outputs at the end effector of the motion element 5. This information can then be used to schedule appropriate control gains to optimize performance.

5. Collision Avoidance—By making use of pre-existing navigation data, collision avoidance can be realized.

6. Robust Control—Operation of the end effector of the motion element 5 in a semiautonomous/autonomous mode is possible while the machine makes small maneuvering motions.

According to the preferred embodiment, the inertial sensor package 1 is embodied as an IMU which comprises an accelerometer 11, a navigation module 12, a fixed level arm 13, a gyro 14, and an AHRS (Altitude Heading Reference System) module 15.

The application of the AGNC®-2000CMIMU coremicro® IMU or any other IMU to the automated machine includes the generation of control loops for enhanced performance and agile operation. These loops are formed through the use of actuators and the IMU linked with software. The inertial sensors package AGNC®-2000CMIMU coremicro® IMU for the automated machine application is totally self contained including miniature size IMU, wireless transmitter, case, and battery.

The actuation of the mechanical links of the crane is accomplished through hydraulic actuators that are controlled with electromechanical servo actuator valves. These valves are very low power devices with a large power gain. They are driven with the output of a typical op amp, with about 5 ma and −10 to +10 volts. These actuator valves can provide very predictable and linear source of pressure with a moderate bandwidth.

This configuration eliminates the inherent reliability problems found with cabling and connectors while lowering installation costs.

The loop controls are configured starting with an inner loop and expanding the functionality with successive layers of outer loop controls, comprising:

(a) an acceleration loop control;

(b) a velocity loop control;

(c) a position loop control;

(d) an angular rate loop control; and (e) an angle loop control.

Figure 4:
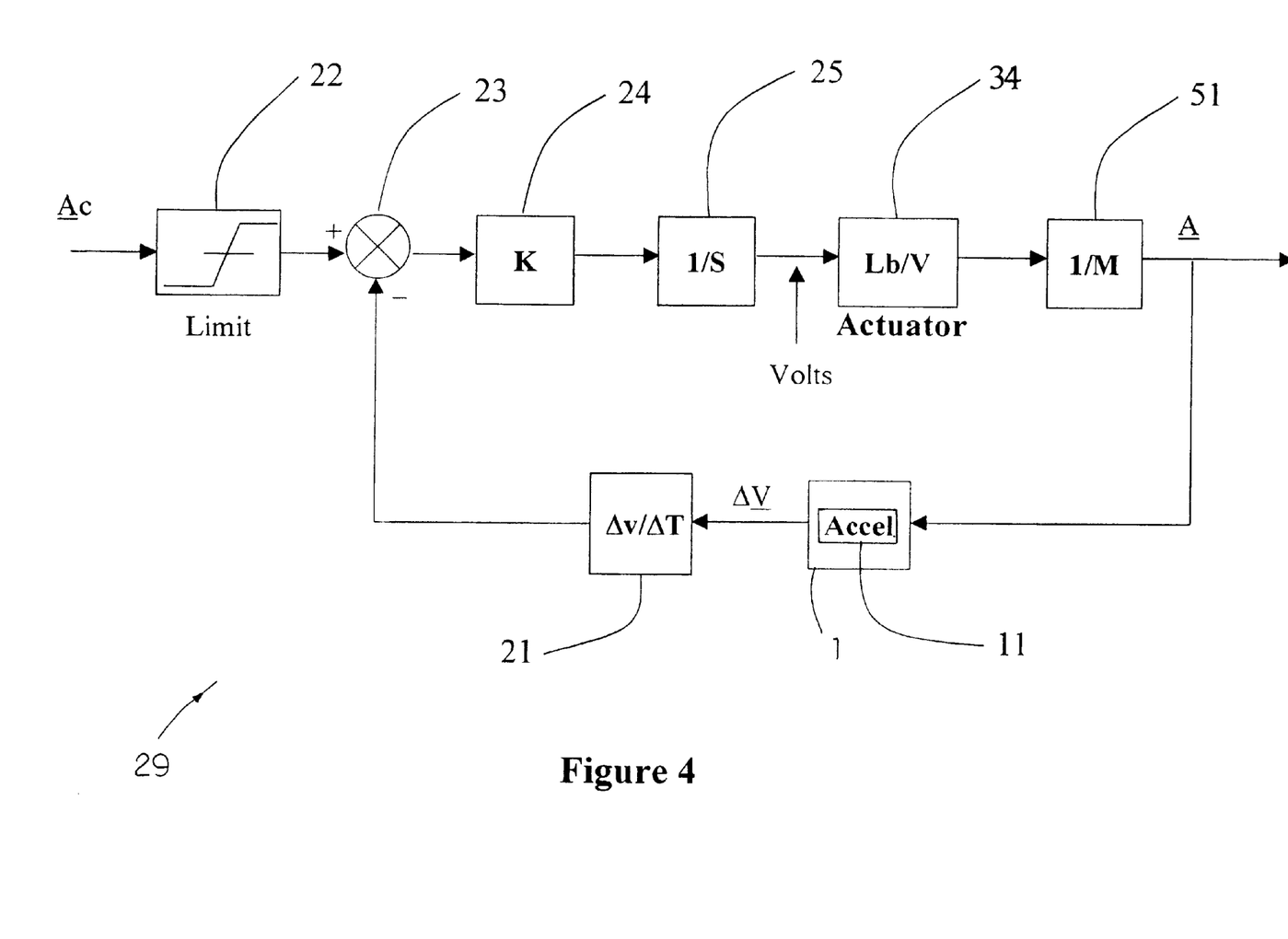
FIG. 4 is a block diagram illustrating an acceleration loop according to the above preferred embodiment of the present invention.

The primary inner loop control is a first order acceleration loop control as shown in FIG. 4. The input consists of a commanded acceleration in three axes with the output acceleration sensed with the IMU. The input command is limited in order to restrict the magnitude of the force generated by the motion actuator 34.

Referring to FIG. 4, the acceleration loop control 29 comprises accelerometer 11 of the IMU 1 for measuring real motion, a converter 21 for converting delta velocity data to acceleration data, a first limit 22 for restricting the magnitude of the force, a first comparator 23 for comparing the acceleration command and measured acceleration, a first amplifier 24 for signal amplifying, and an integrator 25 for signal interation. The processor produced voltage signal is sent to the motion actuator 34 for driving the end effector 51.

The method of acceleration control processing comprises following steps:

(1) measuring an acceleration of the end effector 51 and producing delta velocity data by the accelerometer 11 of the IMU 1;

(2) sending the delta velocity data to the converter 21 in the central control processor 2;

(3) converting the delta velocity data to acceleration data;

(4) inputting the acceleration command signal and limiting it with the first limit 22 and producing bounded acceleration commands;

(5) comparing the limited input acceleration command with the measured acceleration and producing an acceleration error signal by the first comparator 23;

(6) simplifying the acceleration error signal by the first amplifier 24 and then integrating the amplified signal by the integrator 25;

(7) converting the output of the integrator 25 to an analog voltage signal and sending it to the motion actuator 34; and (8) producing force according to the input signal by the motion actuator 34 and driving the end effector 51 to move so that the acceleration error converges to zero.

Figure 5:
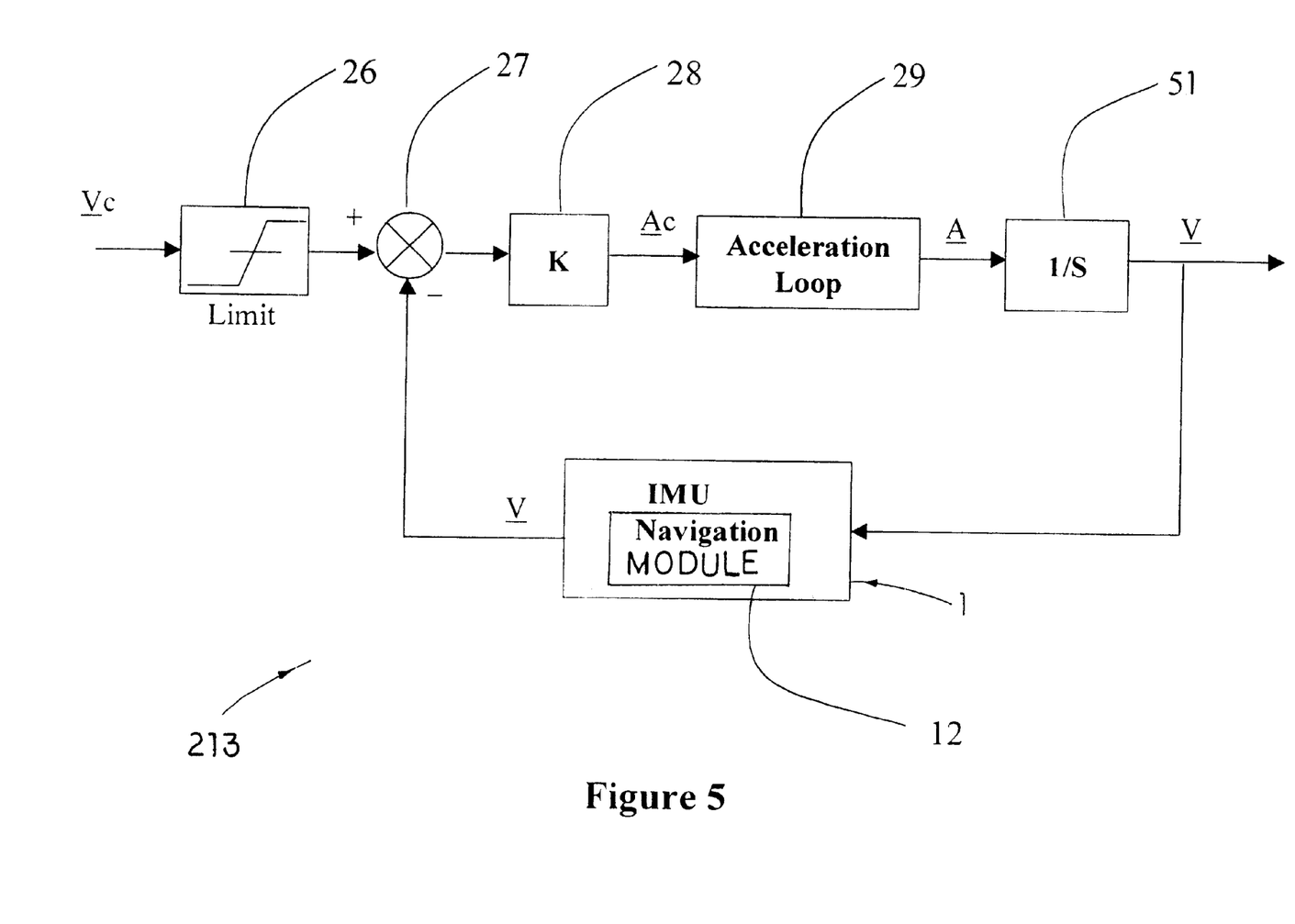
FIG. 5 is a block diagram illustrating a velocity loop according to the above preferred embodiment of the present invention.

Based on the acceleration loop control 29 as shown in FIG. 4. the velocity loop control 213 is built as shown in FIG. 5. The velocity loop control 213 makes use of the acceleration loop control 29 as an inner loop control. This is the first order velocity loop control 213 as shown in FIG. 5 and is realized entirely within the processing module. With the implementation of this loop control. velocity is commanded with respect to the fixed base of the machine and is sensed by the combination of the IMU and navigation equations derived with the constraints of known mechanical links and with the aid of the angular rate loop control.

Referring to FIG. 5, the velocity processing loop control 213 comprises the IMU 1 and its navigation module 12 including processing algorithms for obtaining the real velocity of the end effector 51, a second limit 26 for restricting the magnitude of the velocity, a second comparator 27 for comparing the velocity command and measured velocity, and a second amplifier 28 for signal amplifying. The velocity processing produced data are sent to the acceleration loop control 29 as the input acceleration command for driving the end effector 51 in which the velocity loop control 213 acts as an integrator to transform acceleration to velocity.

The method of velocity control processing comprises following steps:

(1) measuring a velocity of the end effector 51 by the navigation module of the IMU 1;

(2) processing the output data of IMU 1 by using the navigation processing algorithms of the navigation module 12 and producing velocity measurements of the end effector 51;

(3) limiting the input velocity command signal by the second limit 26 and producing limited velocity data;

(4) comparing the limited input velocity data with the measured velocity from the IMU 1 by the second comparator 27 and producing velocity error signal;

(5) amplifying the velocity error signal by the second amplifier 28;

(6) sending the output of the second amplifier 28 to the input of the acceleration loop control 29; and (7) producing force by the motion actuator according to the input signal.

Through the acceleration loop control 29 and driving to the end effector 51, motion is generated so that the velocity error converges to zero.

Figure 6:
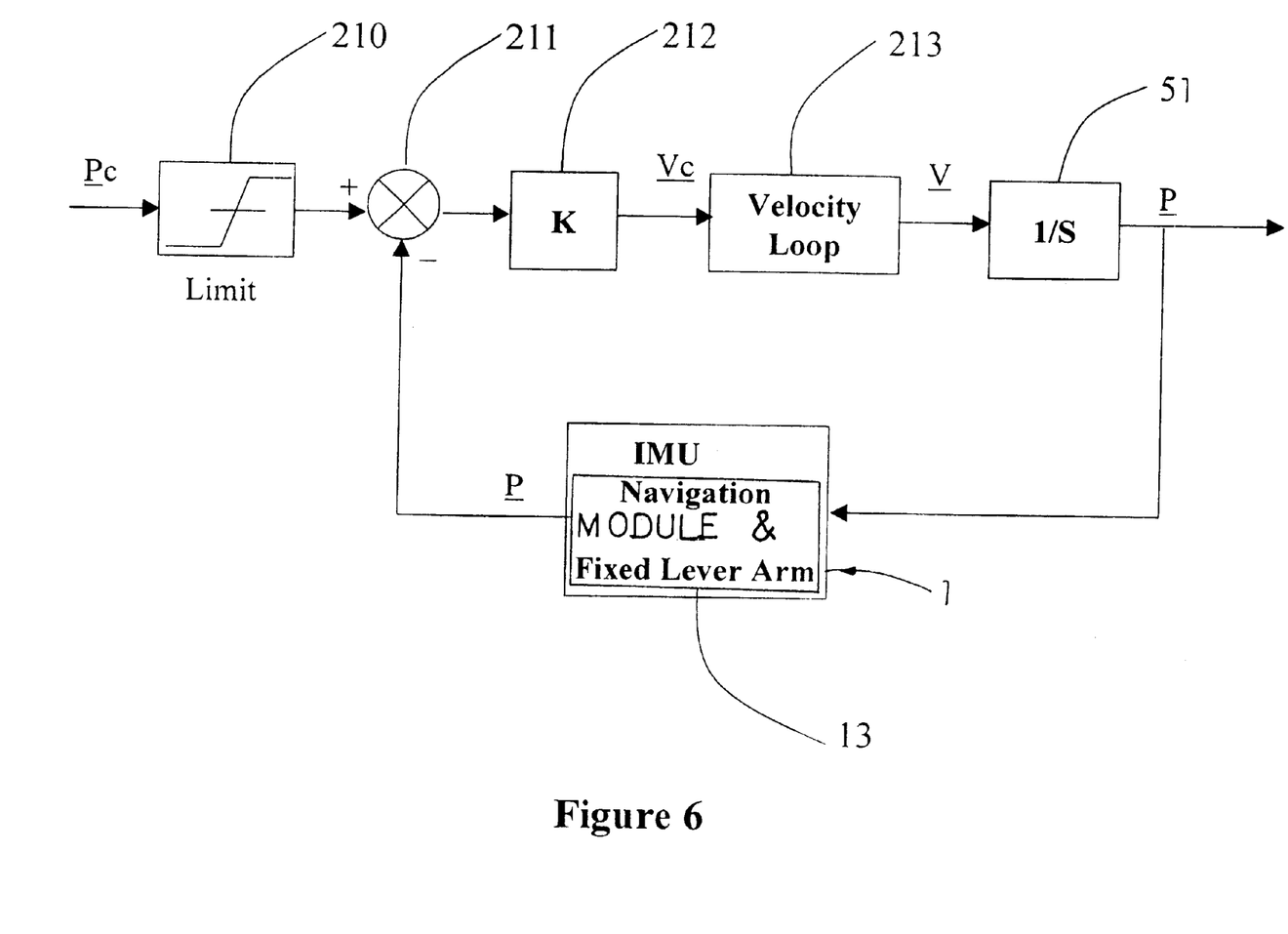
FIG. 6 is a block diagram illustrating a position loop according to the above preferred embodiment of the present invention.

The position control loop control as illustrated in FIG. 6 makes use of the velocity loop control 213 as an inner loop. This is a first order position loop control as shown in FIG. 6 and is realized entirely within the processing module. With the implementation of this loop. position is commanded with respect to the fixed base of the machine and is sensed by the combination of the IMU 1 and navigation modules derived with the constraints of known mechanical links and the aid of the gimbal angles as sensed by the attitude derived in the AHRS equations.

Referring to FIG. 6, the position processing loop comprises the IMU 1 and its processing for obtaining the real position of the end effector 51, a third limit 210 for restricting the magnitude of the position, a third comparator 211 for comparing the position command and measured position, and a third amplifier 212 for error signal amplifying. The position processing produced data are sent to the velocity loop control 213 as the input velocity command for driving the end effector 51 in which the position loop acts as an integrator to transform velocity to position.

The method of position control processing comprises following steps:

(1) measuring a position of the end effector 51 by the IMU 1;

(2) estimating the position by using a fixed lever arm parameter 13;

(3) processing the output data of the IMU 1 by using navigation algorithms and producing position measurement of the end effector 51;

(4) limiting the input position command signal by the third limit 210 and producing limited position data;

(5) comparing limited input position data with the measured position from the IMU 1 by the third comparator 211 and producing position error signal;

(6) amplifying the position error signal by the third amplifier 212:

(7) sending the output of the third amplifier 212 to the input of the velocity loop control 213.

Through the velocity loop control 213, the motion actuator produces force according to the input signal and drives the end effector 51 to move so that the position error converges to zero.

Figure 7:
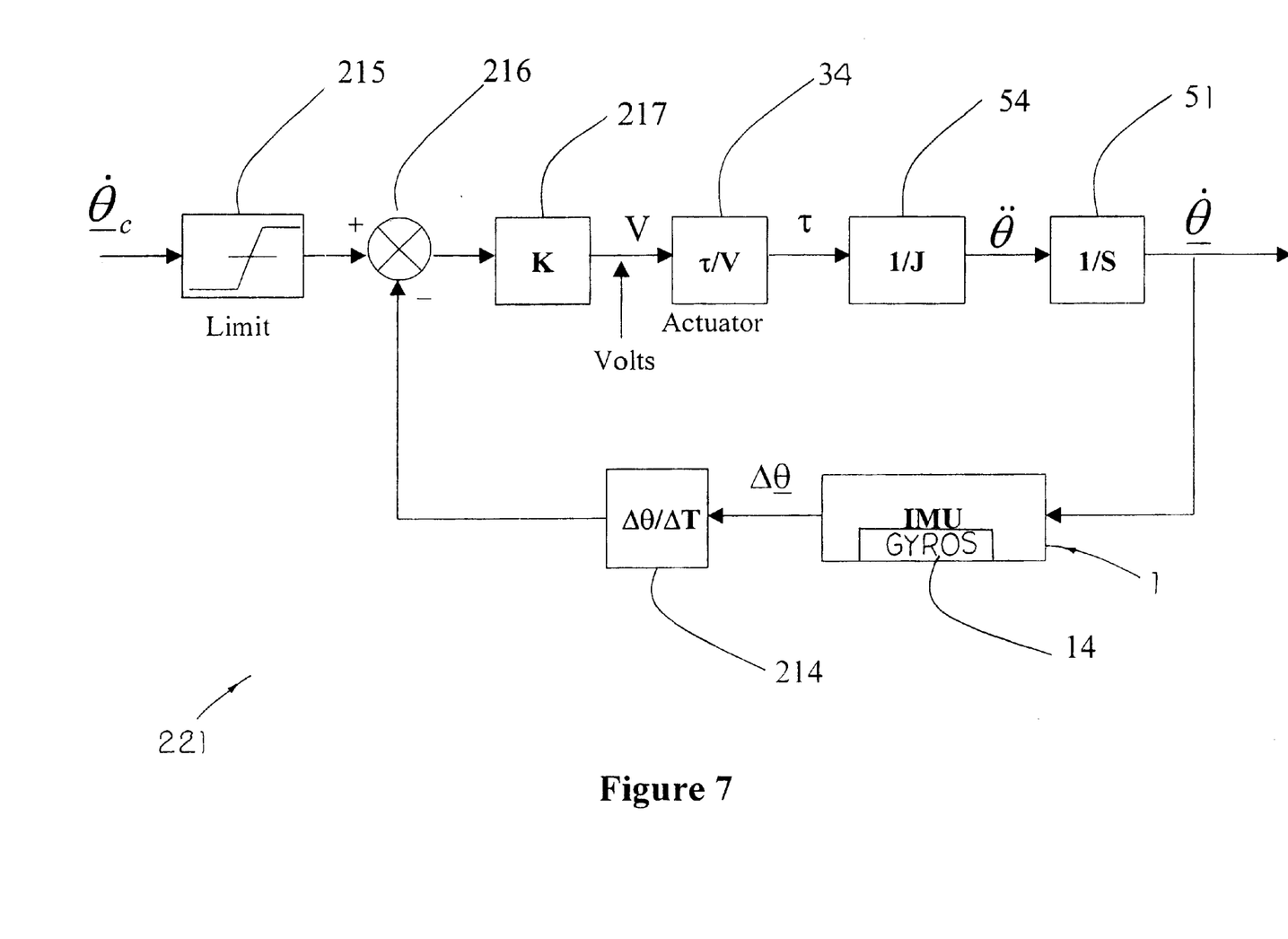
FIG. 7 is a block diagram illustrating an angle rate loop according to the above preferred embodiment of the present invention.

The angular rate control loop consists of an inner loop and successive layers of outer loops. The primary inner loop is a first order angular rate loop as shown in FIG. 7. The input consists of a commanded angular rate in three axis with the output angular rate sensed with the IMU. The input command is limited in order to restrict the magnitude of the torque generated by the motion actuator.

Referring to FIG. 7, the angular rate loop control 221 comprises the IMU 1 and its gyros 14 for obtaining a real angular rate of the end effector 51, a fourth limit 215 for restricting the magnitude of the angular rate, a fourth comparator 216 for comparing the angular rate command and measured angular rate, and a fourth amplifier 217 for signal amplifying. The angular rate processing produced data are sent to the end effector 51 for driving the end effector 51 in which the angular rate loop control 221 acts as an integrator to transform angular acceleration to angular rate.

The method of angular rate control processing comprises following steps:

(1) measuring the angular motion of the end effector 51 by the gyros 14 in IMU 1;

(2) outputting angular data of the gyros in forms of delta angles;

(3) converting the delta angle data to angular rate data by an angular rate converter 214;

(4) limiting the input angular rate command signal by fourth limit 215 and producing limited angular rate data;

(5) comparing the limited input angular rate data with the measured angular rate from the angular rate converter 214 by the fourth comparator 216 and producing angular rate error signal;

(6) amplifying the angular rate error signal by the fourth amplifier 217;

(7) converting the output of the fourth amplifier 217 to analog signal and sending it to the input of motion actuator 34: and (8) producing torque/force that exerts on the end effect 51 by the motion actuator 34 and producing angular acceleration that makes the angular rate error converges to zero.

The angular acceleration is accumulated by the angular rate loop control 221 and produces angular rate. Through the angular rate loop control 221, the motion actuator 34 produces force according to the input signal and drives the end effector 51 to move so that the angular rate error converges to zero.

Figure 8:
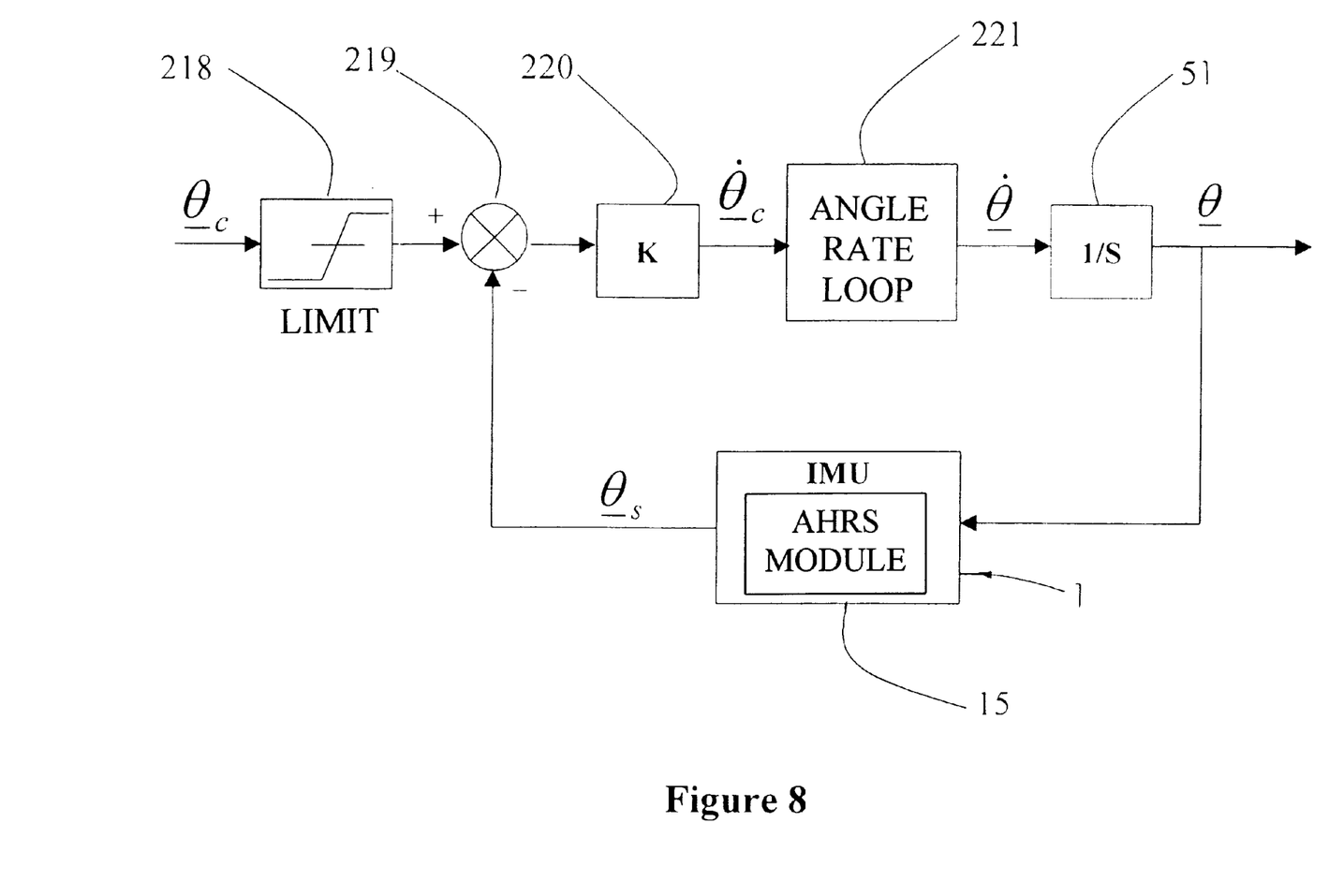
FIG. 8 is a block diagram illustrating an angle loop according to the above preferred embodiment of the present invention.

The angle control loop control as shown in FIG. 8 makes use of the angular rate loop control 221 as an inner loop. This is the first order angle position loop as shown in FIG. 8 and is realized entirely within the processing module. With the implementation of this loop, angle is commanded with respect to the fixed base of the machine and is sensed by the combination of the IMU 1 and its AHRS module derived with the constraints of known mechanical limits on the gimbal angles and known gimbal angles on the links closer to the base.

Referring to FIG. 8, the angle loop control comprises the IMU 1 and its AHRS module for obtaining a real angle of the end effector 51, a fifth limit 218 for restricting the magnitude of the angle, a fifth comparator 219 for comparing the angle command and measured angle, and a fifth amplifier 220 for signal amplifying. The angle processing produced data are sent to the angular rate loop control 221 for driving the end effector 51 in which the angle loop acts as an integrator to transform angular rate to angle.

The method of angle control processing comprises following steps:

(1) measuring the angular motion of the end effector 51 by the IMU 1;

(2) processing the output data of the gyros 14 by the AHRS module 15 and producing angle data of the end effector 51;

(3) limiting the input angle command signal by the fifth limit 218 and producing limited angle data;

(4) comparing the limited input angle data with the measured angle from the IMU 1 by the fifth comparator 219 and producing angle error signal;

(5) amplifying the angle error signal by the fifth amplifier 220;

(6) sending the output of the fifth amplifier 220 to the angular rate loop control 221; and (7) producing torque/force by the angular rate loop control 221 that exerts on the end effect and producing angular rate that makes the angle error converges to zero.

The angular rate is accumulated by angle loop control which acts as an integrator and produces the angle. Through the angle loop control, the motion actuator produces force according to the input signal and drives the end effector 51 so that the angle error converges to zero.

The features of the present invention is summarized as following:

1. An IMU, such as the above mentioned AGNC®-2000CMIMU coremicro® IMU is used to provide data to greatly decrease operational time through the stabilization of the effector with respect to an earth fixed frame. Time can be minimized by doing trajectory planning which makes use of the motion state data. Stabilization and isolation of the effector from external motion disturbances can be achieved through the use of inertial data determined actuator response.

2. After achieving stabilized response of the effector, the operator no longer needs to be as closely involved in the motions of the crane. He can input commands that are structured for semiautonomous/autonomous operation.

3. Performance enhancement can be achieved without upgrading other costly components. By more closely monitoring effector motions, less costly linear and angular direct motion sensors can be utilized.

4. Important safety monitoring can be achieved by comparing the short term navigation solution derived from the mechanical sensors. This navigation solution will be very accurate over short two second intervals. When the two solutions differ by more than a small amount, the system can be shut down.

5. After forming a navigation solution, data is available for the operator's use in directing the machine.

6. Once navigation data is available, it can be stored into a data base each time an item of cargo is handled so that the geographic location of cargo can be retained for future reference.

7. Orientation of cargo can be determined by resolving optical image data into an earth fixed navigation frame of reference.

8. After the implementation of control loops with other existing system components, cargo mass can be determined by measuring loop time constants. This information can be used to schedule gains in order to optimize performance.

9. By making use of preexisting navigation data, collision avoidance can be realized.

10. Operation of the crane in a semiautonomous/autonomous mode is possible while the machine makes small maneuvering motions.

What is claimed is:

1. An operational control system of an automated machine comprising a motion element having an end effector wherein said operational control system comprises:

an inertial sensor package, which is installed at said end effector of said motion element, sensing a motion and motion changes of said end effector and providing a motion measurement of said end effector through a navigation processing of said inertial sensor package to obtain measurement data;

a central control processor receiving said measurement data from said inertial sensor package and comparing said measurement data with a command input to form error data which is received in said central control processor to produce a control signal in said central control processor; and a motion actuator receiving said control signal from said central control processor to control speed force outputs of said motion actuator and driving said end effector of said motion element by said motion actuator according to said control signal, wherein errors between said motion being measured and said command input converges to zero, so as to ensure said end effector of said motion element moves along a trajectory as said command input requires.

2. The system, as recited in claim 1, wherein said motion actuator includes one or more electromechanical servo actuator valves and one or more hydraulic actuators which are controlled b) said electromechanical servo actuator valves, wherein said central control processor receives output of said inertial sensor package and produces commands to said electromechanical servo actuator valves to control said hydraulic actuators for making said motion element move.

3. The system, as recited in claim 2, wherein said control signal is sent to said electromechanical servo actuator valves to control a hydraulic flow to said hydraulic actuators so that speed and force outputs of said hydraulic actuators are controlled.

4. The system, as recited in claim 3, wherein said end effector of said motion element is driven by said hydraulic actuators according to said control signal.

5. The system, as recited in claim 1, further comprising an acceleration loop control which comprises accelerometer of said inertial sensor package for measuring real motion, a converter for converting delta velocity data to acceleration data, a first limit for restricting said magnitude of said force, a first comparator for comparing said acceleration command and measured acceleration, a first amplifier for signal amplifying, and an integrator for signal interation, wherein a produced voltage signal is sent to the motion actuator for driving said end effector.

6. The system, as recited in claim 5, wherein said accelerometers of said inertial sensor package measures acceleration of said end effector and produces delta velocity data, wherein said delta velocity data is sent to said converter in said central control processor to convert to acceleration data, wherein said acceleration data is inputted in said first limit so as to limit said acceleration data and produce acceleration commands, wherein said limited input acceleration commands are compared with said measured acceleration to produce an acceleration error signal by said first comparator, wherein said acceleration error signal is simplified by said first amplifier to form an amplified signal which is then integrated by said integrator. wherein an output of said integrator is converted to an analog voltage signal which is sent to said motion actuator to produce force according to said analog voltage signal by said motion actuator to drive said end effector to move while said acceleration error converges to zero.

7. The system, as recited in claim 6, further comprising a velocity loop control which makes use of said acceleration loop control as an inner loop control, wherein said velocity processing loop control comprises said inertial sensor package and a navigation module thereof for obtaining a real velocity of said end effector, a second limit for restricting said magnitude of said velocity, a second comparator for comparing a velocity command and said measured velocity, and a second amplifier for signal amplifying, wherein velocity processing produced data are sent to said acceleration loop control as said input acceleration command for driving said end effector, wherein said velocity loop control acts as an integrator to transform acceleration to velocity.

8. The system as recited in claim 7, wherein said velocity of said end effector is measured by said navigation module in said inertial sensor package, wherein said out put data of said inertial sensor package is processed by using said navigation module to produce velocity measurement of said end effector. wherein an input velocity signal is limited by said second limit to produce limited velocity data wherein said limited velocity data is compared with said measured velocity from said inertial sensor package by said second comparator to produce a velocity error signal, wherein said velocity error signal is amplified by said second amplifier, wherein an output of said second amplifier is sent to an input of said acceleration loop control to produce force by said motion actuator according to said input signal, wherein through said acceleration loop control and driving to said end effector said motion is generated while said velocity error converges to zero.

9. The system. as recited in claim 8, further comprising a position control loop control which makes use of said velocity loop control as an inner loop wherein said position processing loop comprises said inertial sensor package and a processing for obtaining a real position of said end effector, a third limit for restricting said magnitude of said position, a third comparator for comparing said position command and measured position, and a third amplifier for error signal amplifying. Said position processing produced data are sent to said velocity loop control as said input velocity command for driving said end effector in which said position loop acts as an integrator to transform velocity to position.

10. The system. as recited in claim 9, wherein a position of said end effector is measured by said inertial sensor package so as to estimating said position by using a fixed lever arm parameter of said inertial sensor package. where in said output data of said inertial sensor package is processed to produce a position measurement of said end effector, wherein said position measurement is limited by said third limit to produce limited position data, wherein said limited position data is compared with said measured position from said inertial sensor package by said third comparator to produce a position error signal which is amplified by said third amplifier. wherein an output of said third amplifier is sent to an input of said velocity loop control, wherein through said velocity loop control, said motion actuator produces force according to said input signal and drives said end effector to move while said position error converges to zero.

11. The system as recited in claim 10, further comprising an angular rate loop control which comprises said inertial sensor package and gyros thereof for obtaining a real angular rate of said end effector, a fourth limit for restricting said magnitude of said angular rate, a fourth comparator for comparing said angular rate command and measured angular rate, and a fourth amplifier for signal amplifying, wherein angular rate processing produced data are sent to said end effector for driving said end effector wherein in said angular rate loop control acts as an integrator to transform angular acceleration to angular rate.

12. The system, as recited in claim 11, wherein an angular motion of said end effector is measured by said gyros in said inertial sensor package to output angular data in forms of delta angles, wherein said delta angle data is converted by an angular rate converter to angular rate data which is limited by said fourth limit to limited angular rate data. wherein said limited angular rate data in compared with said measured angular rate from said angular rate converter by said fourth comparator to produce an angular rate error signal, wherein said angular rate error signal is amplified by said fourth amplifier, wherein an output of said fourth amplifier is converted to analog signal and sent to said input of said motion actuator to produce torque and force that exerts on said end effect by said motion actuator and produce an angular acceleration that makes said angular rate error converges to zero, wherein said angular acceleration is accumulated by said angular rate loop control to produce angular rate.

13. The system, as recited in claim 12, further comprising an angle control loop control which makes use of said angular rate loop control as an inner loop, wherein said angle loop control comprises said inertial sensor package and an AHRS (Altitude Heading Reference System) module for obtaining a real angle of said end effector a Fifth limit for restricting said magnitude of said angle a fifth comparator for comparing said angle command and measured angle. and a fifth amplifier for signal amplifying. Said angle processing produced data are sent to said angular rate loop control for driving said end effector in which said angle loop acts as an integrator to transform angular rate to angle.

14. The system, as recited in claim 13, wherein an angular motion of said end effector is measured by said inertial sensor package, wherein output data of said gyros is processed by said AHRS (Altitude Heading Reference System) module to produce angle data of said end effector which is limited by said fifth limit to produces limited angle data, wherein said limited angle data is compared with said measured angle from said inertial sensor package by said fifth wherein an output of said fifth amplifier is sent to said angular rate loop control to produce a torque and force by said angular rate loop control that exerts on said end effect and produces angular rate that makes an angle error converges to zero.

15. The system, as recited in claim 1, further comprising an angular rate loop control which comprises said inertial sensor package and gyros thereof for obtaining a real angular rate of said end effector. a fourth limit for restricting said magnitude of said angular rate, a fourth comparator for comparing said angular rate command and measured angular rate, and a fourth amplifier for signal amplifying, wherein angular rate processing produced data are sent to said end effector for driving said end effector wherein in said angular rate loop control acts as an integrator to transform angular acceleration to angular rate.

16. The system, as recited in claim 15, wherein an angular motion of said end effector is measured by said gyros in said inertial sensor package to output angular data in forms of delta angles, wherein said delta angle data is converted by an angular rate converter to angular rate data which is limited by said fourth limit to limited angular rate data. Wherein said limited angular rate data in compared with said measured angular rate from said angular rate converter by said fourth comparator to produce an angular rate error signal, wherein said angular rate error signal is amplified by said fourth amplifier. wherein an output of said fourth amplifier is converted to analog signal and sent to said input of said motion actuator to produce torque and force that exerts on said end effect by said motion actuator and produce an angular acceleration that makes said angular rate error converges to zero, wherein said angular acceleration is accumulated by said angular rate loop control to produce angular rate.

17. The system, as recited in claim 16, further comprising an angle control loop control which makes use of said angular rate loop control as an inner loop, wherein said angle loop control comprises said inertial sensor package and an AHRS (Altitude Heading Reference System) module for obtaining a real angle of said end effector. a fifth limit for restricting said magnitude of said angle, a fifth comparator for comparing said angle command and measured angle, and a fifth amplifier for signal amplifying. Said angle processing produced data are sent to said angular rate loop control for driving said end effector in which said angle loop acts as an integrator to transform angular rate to angle.

18. The system as recited in claim 17, wherein an angular motion of said end effector is measured by said inertial sensor package, wherein output data of said gyros is processed by said AHRS (Altitude Heading Reference System) module to produce angle data of said end effector which is limited by said fifth limit to produces limited angle data, wherein said limited angle data is compared with said measured angle from said inertial sensor package by said fifth comparator to produce an angle error signal which is amplified by said fifth amplifier, wherein an output of said fifth amplifier is sent to said angular rate loop control to produce a torque and force by said angular rate loop control that exerts on said end effect and produces angular rate that makes an angle error converges to zero.

19. A method of operational control of an automated machine which comprises a motion element having an end effector, wherein said method comprises the steps of:

(a) sensing a motion and motion changes of said end effector of said motion element by an inertial sensor package installed at said end effector, (b) providing a motion measurement of said end effector of said motion element through a navigation processing by said inertial sensor package to obtain measurement data:

(c) sending said measurement data from said inertial sensor package to a central control processor;

(d) receiving said measurement data from said inertial sensor package by said central control processor;

(e) comparing said measurement data with a command input to form error data;

(f) receiving said error data in said central control processor;

(h) producing a control signal by using a controller algorithm in said central control processor;

(i) sending said control signal to a motion actuator to control speed and force outputs of motion actuator; and (j) driving said end effector of said motion element by said motion actuator according to said control signal, wherein an error between said measured motion and said command input of said motion actuator converges to zero, so as to ensure said end effector of said motion element moves along a trajectory as said command input requires.

20. The method, as recited in claim 19, wherein said motion actuator comprises one or more hydraulic actuators and one or more electronmechical servo valves, wherein said control signal is sent to said electromechanical servo actuator valves to control a hydraulic flow to said hydraulic actuators so as to control speed and force outputs of said hydraulic actuators.

21. The method, as recited in claim 19, further comprising an acceleration loop control which comprises the steps of:

(a.1) measuring an acceleration of said end effector and producing delta velocity data by accelerometer provided in said inertial sensor package;

(a.2) sending said delta velocity data to a converter in said central control processor;

(a.3) converting said delta velocity data to acceleration data;

(a.4) inputting and limiting said acceleration data with a first limit and producing limited acceleration commands:

(a.5) comparing said limited input acceleration command with said measured acceleration and producing an acceleration error signal by a first comparator;

(a.6) simplifying said acceleration error signal by a first amplifier and then integrating said amplified signal by an integrator;

(a.7) converting an output of said integrator to an analog voltage signal and sending said analog voltage signal to said motion actuator; and (a.8) producing a force according to said analog voltage signal by said motion actuator and driving said end effector to move while an acceleration error converges to zero.

22. The method, as recited in claim 21, further comprising a velocity loop control which makes use of said acceleration loop control as an inner loop control and comprises the steps of:

(b.1) measuring a velocity of said end effector by a navigation module of said inertial sensor package;

(b.2) processing said output data of inertial sensor package by using said navigation and producing velocity measurements of said end effector;

(b.3) limiting said velocity measurements by a second limit and producing limited velocity data;

(b.4) comparing said limited velocity data with said measured velocity from said inertial sensor package by a second comparator and producing a velocity error (b.5) amplifying said velocity error signal by a second amplifier;

(b.6) sending an output of said second amplifier to an input of said acceleration loop control; and (b.7) producing a force by said motion actuator according to said in put signal, wherein through said acceleration loop control and driving to said end effector, a motion is generated while said velocity error converges to zero.

23. The method, as recited in claim 22, further comprising a position control loop control which makes use of said velocity loop control as an inner loop and comprises the steps of.

(c.1) measuring a position of said end effector by said inertial sensor package (c.2) estimating said position by using a fixed lever arm parameter;

(c.3) processing said output of said inertial sensor package by using navigation algorithms and producing a position measurement of said end effector;

(c.4) limiting said position measurement by a third limit and producing limited position data;

(c.5) comparing said limited position data with said measured position from said inertial sensor package by a third comparator and producing a position error signal;

(c.6) amplifying said position error signal by a third amplifier; and (c.7) sending an output of said third amplifier to an input of said velocity loop control, wherein through said velocity loop control, said motion actuator produces a force to drive said end effector to move while said position error converges to zero.

24. The method, as recited in claim 23, further comprising an angular rate control loop which comprises the steps of:

(d.1) measuring an angular motion of said end effector by gyros provided in said inertial sensor package;

(d.2) outputting angular data of said gyros in forms of delta angles;

(d.3) converting said delta angle data to angular rate data by an angular rate converter;

(d.4) limiting said angular rate data by a fourth limit and producing limited angular rate data;

(d.5) comparing said limited angular rate data with said measured angular rate from said angular rate converter by a fourth comparator and producing an angular rate error signal;

(d.6) amplifying said angular rate error signal by a fourth amplifier;

(d.7) converting an output of a fourth amplifier to an analog signal and sending said analog signal to an input of said motion actuator; and (d.8) producing a torque and force that exerts on said end effect by said motion actuator and producing an angular acceleration that makes said angular rate error converges to zero.

25. The method, as recited in claim 24, further comprising an angle control loop control which makes use of said angular rate loop control as an inner loop and comprises the steps of:

(e.1) measuring an angular motion of said end effector by said inertial sensor package, (e.2) processing said output data of said gyros by an AHRS (Altitude Heading Reference System) module provided in said inertial sensor package and producing angle data of said end effector;

(e.3) limiting said angle data by a fifth limit and producing limited angle data;

(e.4) comparing said limited angle data with said measured angle from said inertial sensor package by a fifth comparator and producing an angle error signal;

(e.5) amplifying said angle error signal by a fifth amplifier:

(e.6) sending an output of said fifth amplifier to said angular rate loop control: and (e.7) producing a torque and force by said angular rate loop control that exerts on said end effect and producing an angular rate that makes said angle error converges to zero.

26. The method, as recited in claim 19, further comprising an angular rate control loop which comprises the steps of:

(d.1) measuring an angular motion of said end effector by gyros provided in said inertial sensor package;

(d.2) outputting angular data of said gyros in forms of delta angles;

(d.3) converting said delta angle data to angular rate data by an angular rate converter;

(d.4) limiting said angular rate data by a fourth limit and producing, limited angular rate data;

(d.5) comparing said limited angular rate data with said measured angular rate from said angular rate converter by a fourth comparator and producing an angular rate error signal;

(d.6) amplifying said angular rate error signal by a fourth amplifier;

(d.7) converting an output of a fourth amplifier to an analog signal and sending said analog signal to an input of said motion actuator; and (d.8) producing a torque and force that exerts on said end effect of said motion actuator and producing an angular acceleration that makes said angular rate error converges to zero.

27. The method, as recited in claim 26, further comprising an angle control loop control which makes use of said angular rate loop control as an inner loop and comprises the steps of:

(e.1) measuring an angular motion of said end effector by said inertial sensor package;

(e.2) processing said output data of said gyros by an AHRS (Altitude Heading Reference System) module provided in said inertial sensor package and producing angle data of said end effector:

(e.3) limiting said angle data by a fifth limit and producing limited angle data;

(e.4) comparing said limited angle data with said measured angle from said inertial sensor package by a fifth comparator and producing an angle error signal:

(e.5) amplifying said angle error signal by a fifth amplifier:

(e.6) sending an output of said fifth amplifier to said angular rate loop control; and (e.7) producing a torque and force by said angular rate loop control that exerts on said end effect and producing an angular rate that makes said angle error converges to zero.

* * * * *

UNITED STATES PATENT AND TRADEMARK OFFICE
CERTIFICATE OF CORRECTION

PATENT NO. : 6,463,357 B1
DATED : October 8, 2002
INVENTOR(S) : Hiram McCall et al.

It is certified that error appears in the above-identified patent and that said Letters Patent is hereby corrected as shown below:

<u>Column 1,</u>
After the "1. Field of the Invention" and before the "2. Description of Related Arts", insert the following paragraph:
-- This invention was made with Government support under Contract No. DAAE30-99-C-1046 awarded by the US Army Armament Research, Development and Engineering Center, Picatinny Arsenal, NJ 07806. The Government has certain rights in the invention. --

Signed and Sealed this

Fourth Day of February, 2003

JAMES E. ROGAN
*Director of the United States Patent and Trademark Office*

UNITED STATES PATENT AND TRADEMARK OFFICE
CERTIFICATE OF CORRECTION

PATENT NO.      : 6,463,357 B1
DATED           : October 8, 2002
INVENTOR(S)     : Hiram McCall et al.

It is certified that error appears in the above-identified patent and that said Letters Patent is hereby corrected as shown below:

<u>Title page,</u>
Item [75], the order of the inventors should be changed from "Inventors: Dong An; Zongke Li; Hiram McCall; Ching-Fang Lin, all of Simi Valley, CA (US)" to
-- Inventors: Hiram McCall; Ching-Fang Lin; Dong An; ZongKe Li, all of Simi Valley, CA (US) --.

Signed and Sealed this

Fifteenth Day of April, 2003

JAMES E. ROGAN
*Director of the United States Patent and Trademark Office*